No. 733,111. Patented July 7, 1903.

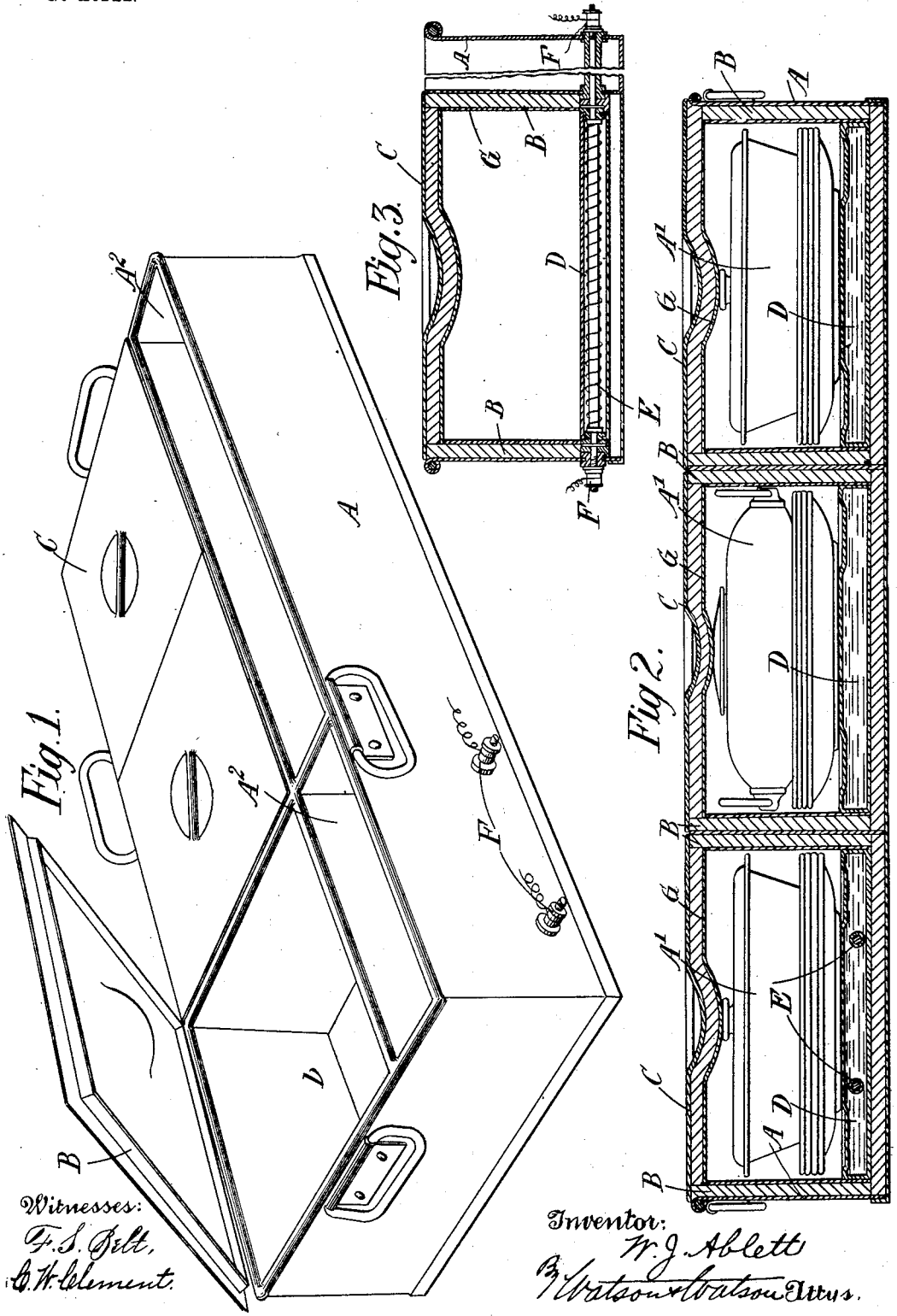

UNITED STATES PATENT OFFICE.

WILLIAM JOHN ABLETT, OF LONDON, ENGLAND.

VESSEL FOR CONTAINING FOOD.

SPECIFICATION forming part of Letters Patent No. 733,111, dated July 7, 1903.

Application filed August 5, 1901. Serial No. 71,114. (No model.)

*To all whom it may concern:*

Be it known that I, WILLIAM JOHN ABLETT, a subject of the King of England, residing at London, England, have invented certain new and useful Improvements in Vessels for Containing Food, (for which I have made application for Letters Patent in Great Britain, No. 13,787, dated July 6, 1901,) of which the following is a specification.

The present invention relates to apparatus for carrying hot foods, arranged to retain the foods at the requisite high temperature for a considerable time.

In sending out prepared food from restaurants and distributing-kitchens it is often necessary to keep the dishes hot for several hours, and hitherto this has been effected by means of what are known and hereinafter referred to as "Norwegian stoves." These essentially consist of boxes which are lined with non-conducting material, such as felt or sawdust, and the layers of non-conducting material are usually of considerable thickness—say two inches or more. The vessel containing the hot food is placed in the interior and the lid shut down, so that the food is surrounded on every side by non-conducting material and may retain its heat for a considerable time. The following defects are noticeable in using these vessels: First, the great thickness of non-conducting material necessary; secondly, since the only heated body is the food all the heat must come therefrom, and unless the food be at a very high temperature the chamber may cool too quickly. Further, to obtain the best results it appears that there should be no air-space between the food vessel and the non-conducting material. This makes it necessary to give the vessel a shape which will exactly fit the cavity of the box, which is often inconvenient and undesirable, and when the vessels are ordinary tureens, dishes, and the like prevents the obtainment of the most satisfactory result. In my apparatus these difficulties are obviated by means of an apparatus which is specially adapted to be used with tureens, dishes, and the like.

According to one method of carrying out this invention a box of suitable dimensions is employed, having sides, bottom, and top of non-conducting material, as in the case of an ordinary Norwegian stove. A flat vessel, made of any suitable material, but preferably of enameled metal, is inserted within the box, completely covering the bottom of it. This vessel can be removable, and before insertion it is filled with some substance, preferably liquid, at a temperature above the boiling-point of water. The food in tureens, dishes, and the like and the plates are then placed upon this vessel and the lid is closed down. Owing to the high temperature of the liquids the chamber and the food contained within it are kept at a high temperature for a longer time than in the ordinary stove even though the walls of non-conducting material should be thinner than usual. The liquid conveniently may be aqueous or other solution which when heated under ordinary atmospheric pressure has a boiling-point higher than that of pure water—*i. e.*, 100° centigrade, (212° Fahrenheit.) Examples of such solutions are: potassium carbonate in water which, if saturated, boils at 135° centigrade, (275° Fahrenheit,) saturated solution of niter, 116° centigrade, (241° Fahrenheit,) saturated calcium chlorid, 180° centigrade, (356° Fahrenheit.)

The solutions need not necessarily be saturated unless the greatest possible excess of heat above the ordinary boiling-point of water be needed. Calcium chlorid, for example, in less than one-third the quantity necessary to saturate a given quantity of water will raise its boiling-point to about 130° centigrade, (266° Fahrenheit.) The most suitable results would be obtained with calcium-chlorid solutions made sufficiently strong to give boiling-points of from 130° to 150° centigrade, (266° to 302° Fahrenheit.) I do not, however, confine myself to those limits, but may make use of liquids and solutions whose boiling-points vary from 101° centigrade (240° Fahrenheit) to 180° centigrade (356° Fahrenheit) or more, according to the degree of heat desired and the length of time for which it is to be maintained. Instead of solutions other heat-retaining substances, such as lime, might be used within the radiators.

In the accompanying drawings, Figure 1 is a perspective view, Fig. 2 a longitudinal section, and Fig. 3 a transverse section, of a preferred form of apparatus constructed in accordance with my invention.

Like letters indicate like parts throughout the drawings.

A tray A, preferably of aluminium, having walls of non-conducting material B, is provided with compartments A', of similar material, to contain dishes, each compartment having a close-fitting lid C, of non-conducting material, a heat-radiator or liquid-chamber D of the kind described above, and an inner lining of aluminium G. Such a tray will practically be a combination of several of the stoves hereinbefore described and will be particularly adapted to contain a dinner of several courses. The radiator D being removable can be taken out of any compartment or compartments in which it is not required, such compartments becoming for all practical purposes ordinary Norwegian stoves. The tray is also provided with additional compartments $A^2$ for cutlery, cruets, and other table furniture. The heat is conveniently supplied by an electric current passing through resistance-coils E in the liquid-chamber, the metallic contacts F being adapted to complete the circuit when the receptacles are pushed into the insulated boxes. If desired, the heat-radiators might be permanently attached to the stove, or the partitions between the different compartments of a tray might be cut away at the bottom to allow one radiator to be passed in lengthwise beneath all the compartments at the same time. Any of the compartments also might be provided with chambers containing cold solutions where necessary.

After use the radiators might still be kept hot by placing them in a chamber of non-conducting material. The latter chamber might also be provided with contact-pieces so arranged that when the radiator is placed in the chamber contact is made, so that electric current passes through the liquid and again raises its temparature, the heat not being able to pass away, because the radiator is surrounded by non-conducting material. In the same way should the food be carried out in carts or conveyances electric accumulators might be provided in the conveyances, and connections might be made from the stoves to the accumulators during the distribution. In a similar way before use the radiators may be heated by passing an electric current through the liquid or by any other convenient means.

The advantages of the combination of non-conducting chambers with a heat-radiator would be several: First, owing to the influence of the radiator the walls of the stove would be made thinner, making the apparatus less clumsy and more compact than usual, while the temperature would be well maintained; secondly, the food need not be at a very high temperature, as the radiator would heat the chamber and maintain a suitable temperature in the food; thirdly, the vessels need not be shaped to the cavity, and the loss of heat resulting from the air-space would be compensated by the high temperature of the radiator.

Of course the radiator could also be used, if desired, for stoves whose walls were of ordinary thickness—say two inches or more—and would distinctly increase their efficiency.

What I claim as my invention, and desire to secure by Letters Patent, is—

1. In a portable apparatus for maintaining the temperature of heated food, the combination of a receptacle having non-heat-conducting walls, and a removable, relatively flat, vessel arranged at the bottom of said receptacle to form a support for the food-container, said removable vessel containing liquid having a boiling-point higher than that of water.

2. In a portable apparatus for maintaining the temperature of heated food, the combination of a receptacle having a series of compartments each having non-heat-conducting walls, and a removable, relatively flat, vessel arranged within one or more of said compartments, to serve as a support for a dish or food-container placed therein, and containing an aqueous solution of calcium chlorid, as and for the purpose described.

3. In an apparatus for maintaining the temperature of heated food, the combination with a receptacle having a non-heat-conducting lining and adapted to receive a dish or other food-container, of a removable vessel arranged at the bottom of said receptacle and containing a hot aqueous solution of calcium chlorid, and resistance-coils arranged within said removable vessel and adapted to be connected with electric conductors outside of said receptacle, as and for the purpose described.

4. The herein-described apparatus for use in transporting food in heated condition consisting of a receptacle having its interior divided into a series of covered compartments, each adapted to receive a dish or food-container and having a non-heat-conducting lining, and suitable uncovered compartments, $A^2$, for table furniture, a removable vessel containing a hot aqueous solution of calcium chlorid arranged within the bottom of one of the covered compartments of said receptacle, and resistance-coils extending through said removable vessel and adapted to be connected with terminals arranged outside of said receptacle, substantially as described.

In testimony whereof I have signed my name to this specification in the presence of two subscribing witnesses.

WILLIAM JOHN ABLETT.

Witnesses:
B. DUNBAR KILBURN,
HARRY B. BRIDGE,